(12) United States Patent
Salvato et al.

(10) Patent No.: US 6,375,368 B1
(45) Date of Patent: Apr. 23, 2002

(54) SECTIONAL CAMERA PLATFORM

(76) Inventors: Charles S. Salvato; Nicholas C. Salvato, both of 1420 N. Atlantic Ave., Ste 102, Daytona Beach, FL (US) 32118

( * ) Notice: Subject to any disclaimer, the term of this patent is extended or adjusted under 35 U.S.C. 154(b) by 0 days.

(21) Appl. No.: 09/688,589

(22) Filed: Oct. 16, 2000

(51) Int. Cl.⁷ .............................................. G03B 17/00
(52) U.S. Cl. .................................... 396/419; 248/187.1
(58) Field of Search ................... 396/1, 419; 248/187.1

(56) References Cited

U.S. PATENT DOCUMENTS

| | | |
|---|---|---|
| 2,472,944 A | 6/1949 | Furer et al. |
| 2,719,043 A | 9/1955 | Oppenheimer |
| 2,725,783 A | 12/1955 | Jackson |
| 3,758,205 A | 9/1973 | Oxbery |
| 4,542,909 A | 9/1985 | Littwin et al. |
| 4,996,547 A | 2/1991 | McKeown et al. |
| 5,177,516 A | 1/1993 | Fitz et al. |
| 5,683,063 A | 11/1997 | Seiders et al. |
| 5,727,645 A * | 3/1998 | Woodling ................... 182/2.1 |
| 6,264,001 B1 * | 7/2001 | Herschbach ................ 182/150 |

* cited by examiner

*Primary Examiner*—David M. Gray
(74) *Attorney, Agent, or Firm*—Edward M. Livingston, Esq.

(57) ABSTRACT

A sectional camera platform (1) is generally circular with a platform floor (2) that is preferably grated for vertical visibility and surrounded by a kick plate (3) about ankle height. A back portion of the platform is a worker cage (17) surrounded by guard railing (18). At a center of the platform is a detachable camera post (14) on which a camera (15) can swivel with unobstructed view over front and side portions. A worker seat can be positioned proximate the camera post. The platform is attachable adaptively to a wide selection of lifting, handling and mobile equipment that includes aerial booms (20), lift forks, cranes, truck beds, swivel beds, levelers and surface cinematographic equipment. The platform is made in sections which are assembled for its use and disassembled for its storage and transport. A desired selection of electrical power and peripheral scene-shooting equipment can be provided for use on or in proximity to the platform.

21 Claims, 2 Drawing Sheets

SECTIONAL CAMERA PLATFORM

BACKGROUND OF THE INVENTION

This invention relates to platforms for TV and cinema photography or scene shooting from aerially maneuverable booms and more particularly to a camera boom platform made in sections that can be packaged, stored, transported, assembled where used, and positioned on a wide selection of aerial-boom or surface-mobile equipment for quick, convenient and adaptable use for cinematography.

Cinematographic boom platforms for shooting scenes aerially are well known. Most are quite specialized to achieve aerial movement universality with required precision and control. Most also are adapted to use in studios where most cinematography is done. They are generally big, heavy and not well suited to transportation and use outside of the studios. Nowadays, however, there is a trend towards on-scene shooting. At the same time, there has been considerable development of industrial booms with precision boom-point control. However, there is no known boom platform that is adequate for on-site use on a sufficiently wide variety of boom machinery and equipment that is likely to be available where desired for on-site cinematography.

Examples of related but different boom platforms are described in the following patent documents. U.S. Pat. No. 5,683,063, issued to Seiders, et al. on Nov. 4, 1997, described a camera mount assembly having a structure with permanent assembly instead of the sectional-assembly structure for attachment to aerial lift equipment as taught by this invention. U.S. Pat. No. 5,177,516 issued to Fitz, et al. on Jan. 5, 1993, described a two-arm boom having oppositely disposed cages for boom-balance weights. U.S. Pat. No. 4,996,547, issued to McKeown, et al. on Feb. 26, 1991, described a particularly heavy and unified instead of light and sectioned boom platform for containing geological measuring instrumentation. U.S. Pat. No. 4,542,909, issued to Littwin, et al. on Sep. 24, 1985, described a ground-level camera cart. Other ground-based, non-sectional and permanent-structure camera booms are described also by U.S. Pat. No. 2,725,783 issued to Jackson on Dec. 6, 1955, U.S. Pat. No. 2,719,043, issued to Oppenheimer on Sep. 27, 1955, and U.S. Pat. No. 2,472,944, issued to Furer, et al. on Jun. 14, 1949.

SUMMARY OF THE INVENTION

Objects of patentable novelty and utility taught by this invention are to provide a sectional camera platform which:

provides cinematographic capability of a wide selection of studio equipment on an easily portable platform that can be used on construction equipment that can be made available on site;

has a circular structure that can be attached to an aerial boom, positioned on a wide selection of cinematographic vehicles or can be carried on a light truck;

is structured with low weight by eliminating conventional perimeter plates to contain a camera post, floor, side walls, camera equipment, operator support and camera peripherals; is structurally sectional for quick and easy assembly for use and disassembly for handling, storage and shipping; and can be fitted with known maneuvering controls, power supplies, communication devices and cinematographic equipment.

This invention accomplishes these and other objectives with a sectional camera platform that is generally circular with a floor that has preferably grating porosity and visibility surrounded by a kick plate about ankle height. A back portion of the platform is a worker cage surrounded by guard railing. At a center of the platform is a detachable camera post on which a camera can swivel with unobstructed view over a front half and parts of the sides. A worker seat can be positioned proximate the camera with desired swiveling capability. The platform is attachable adaptively to a wide selection of lifting, handling and mobile equipment that includes aerial booms, lift forks, cranes, truck beds, swivel beds, levelers and surface camera equipment. The platform is made in sections which are assembled for its use and disassembled for its storage and transport. A desired selection of electrical power and peripheral scene-shooting equipment can be provided for use on or in proximity to the platform.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

Figure 1:
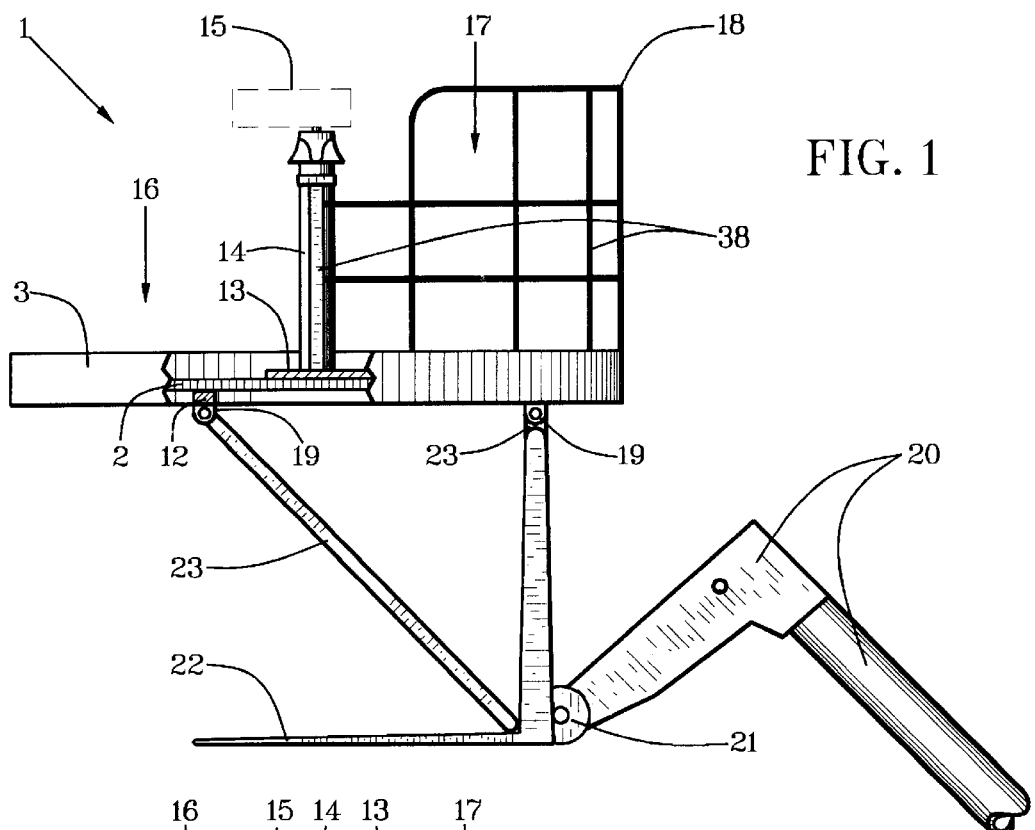
FIG. 1 is a partially cutaway side view of the sectional camera platform on an end of an aerial boom.

1. Sectional camera platform
2. Platform floor
3. Kick plate
4. Grating members
5. First floor section
6. Second floor section
7. First attachment rod
9. First support rod
10. Second attachment rod
12. Second support rod
13. Camera-post attachment
14. Camera post
15. Camera
16. View extension
17. Cage
18. Guard railing
19. Platform attachments 20. Aerial boom
21. Leveling axle
22. Lift fork
23. Extension rods
24. Pivot axle
25. Pivot base
26. Pivot attachment
27. Pivot gear
28. Pivot motor
29. Gear teeth
30. First channel rod
31. Second channel rod
32. Assembly fastener
33. First rectangular tube
34. Second rectangular tube
35. First sleeve
36. Second sleeve
37. Railing joint
38. Railing uprights first to FIGS. 1–2, a sectional camera platform 1 has a platform floor 2 surrounded by a kick plate 3 extended upwardly to about ankle height above a top side of outside edges of the platform floor 2 which has floor sections that are sized, shaped and structured predeterminedly for being joined for on-site cinematography and disjoined for storage and transport.

Preferably, the platform floor 2 is generally round and made of grating with predetermined spacing for vertical vision between orthogonally positioned grating members 4 that are made of a suitable rigid material that can include aluminum. However, the platform floor 2 may also be solid or grated and covered with carpeting.

The floor sections include at least a first floor section 5 and a second floor section 6. The first floor section 5 is supported by a first attachment rod 7 and at least one first support rod 9. The second floor section 6 is supported by a second attachment rod 10 and at least one second support rod 12. The support rods 9 and 12 are connected directly to the kick plate 3, thereby eliminating a perimeter plate found in conventional camera platforms. The elimination of a perimeter plate reduces the weight of the platform.

A camera-post attachment 13 proximate a center of the platform floor 2 is provided for a camera post 14 on which a camera 15 can swivel with camera view over a view extension 16 that is oppositely disposed from a cage 17 for workers. The cage 17 is surrounded by guard railing 18 in sections that can be assembled and disassembled as for the platform floor 2. The guard railing 18 prevents workers from falling and gives them something to hold onto for stability when being aerially maneuvered. Out over the view extension 16, however, there is only the kick plate 3 that does not obstruct camera view. At sides of the camera post 14, the guard railing 18 is preferably table height to allow access to the camera and side view while yet providing railing for safety. Guard railing 18 at sides of and at a rear of the cage 17 preferably has at least a waist height.

Platform attachments 19, which include attachment housing having fastener-shaft receptacles that include orifices, on the platform floor 2 are provided for attachment of predetermined platform-maneuvering equipment that can include an aerial boom 20 and other lifting, hoisting, carrying and transportation equipment. Most present aerial equipment such as the aerial boom 20 is self-leveling as represented generally by a leveling axle 21 for a lift fork 22 to which a plurality of the platform attachments 19 are attachable with extension rods 23 as appropriate for particular platform-maneuvering equipment.

Figure 3:
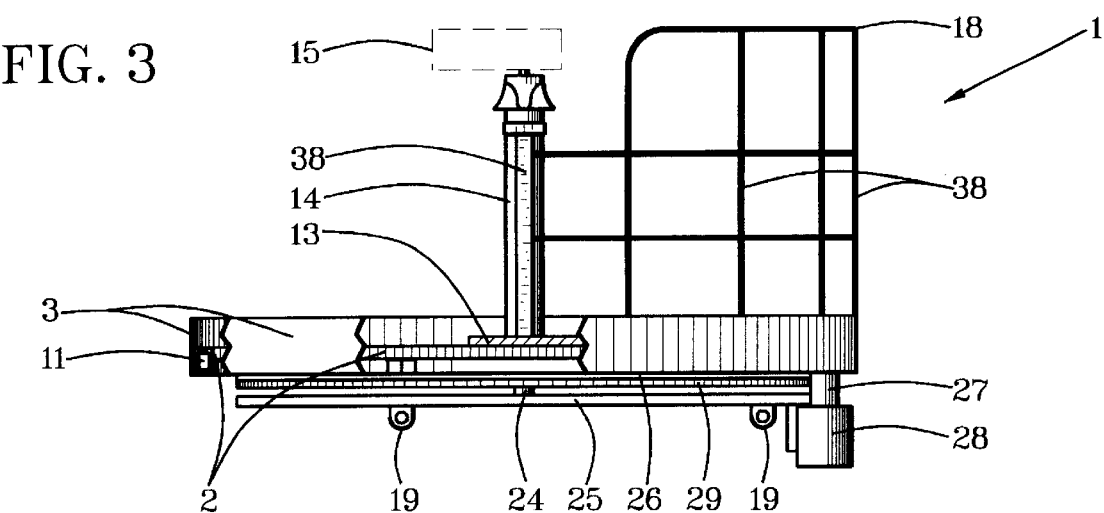
FIG. 3 a partially cutaway side view of the sectional camera platform attached to a platform rotator.

Referring to FIG. 3, in addition to swiveling of the camera 15 on the camera post 14 to achieve 360° viewing, the sectional camera platform 1 can be pivotal on a pivot axle 24 intermediate a pivot base 25 and a pivot attachment 26 in rotational reaction to a pivot gear 27 on a pivot motor 28 that is attached to the pivot base 25 for selective-direction rotation of gear teeth 29 on the pivot attachment 26. The pivot gear 27 is matched to the gear teeth 29 for optionally sprocket, worm, helical or chain gearing. The gear teeth 29 can be full-circle for full revolution or part circle for part rotation. The platform attachments 19 are attached to the pivot base 25 and the pivot attachment 26 is attached directly to the sectional camera platform 1.

Figure 4:
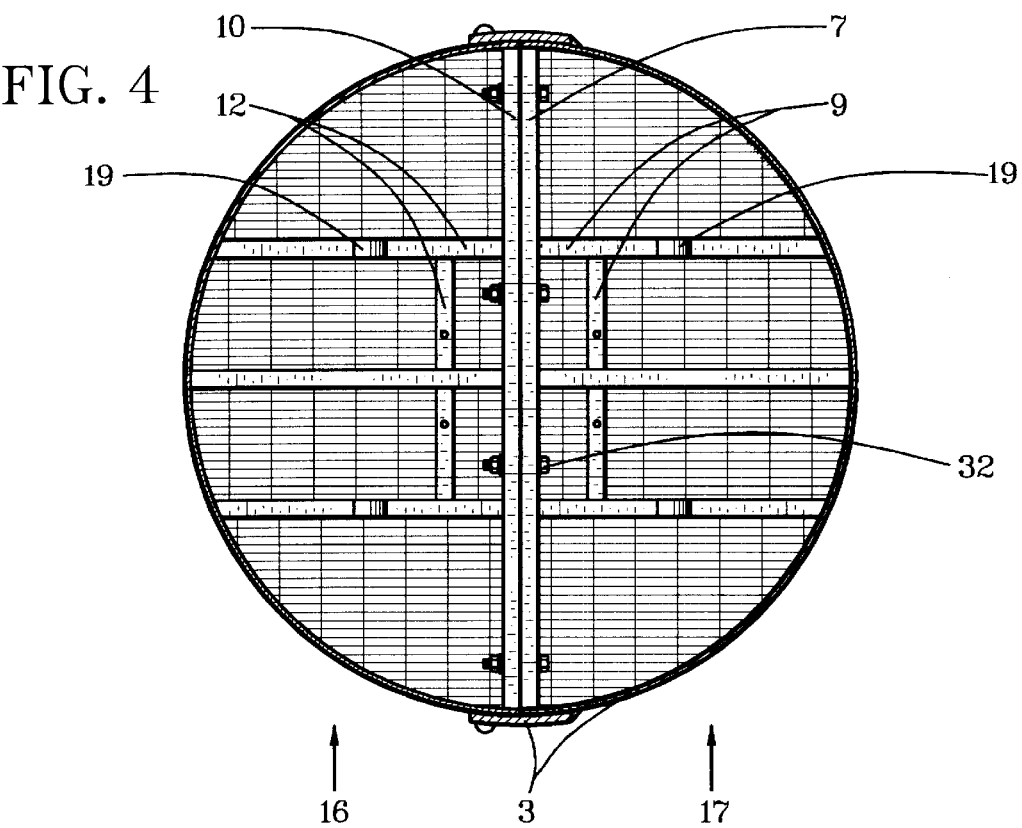
FIG. 4 is a bottom view of the sectional camera platform.

Referring to FIGS. 1–4, the platform attachments 19 are attached preferably to the first support rod 9 and the second support rod 12 at predetermined oppositely disposed distances from the first attachment rod 7 and the second attachment rod 10. The kick plate 3 is attached to outside edges of the first support rod 9 and the second support rod 12. The kick plate 3 can be two half circles of approximately one-quarter-inch plate aluminum bolted together as shown in FIG. 4 or a flexible sheet of harder metal that is rolled up for disassembly and unrolled for assembly.

Figure 2:
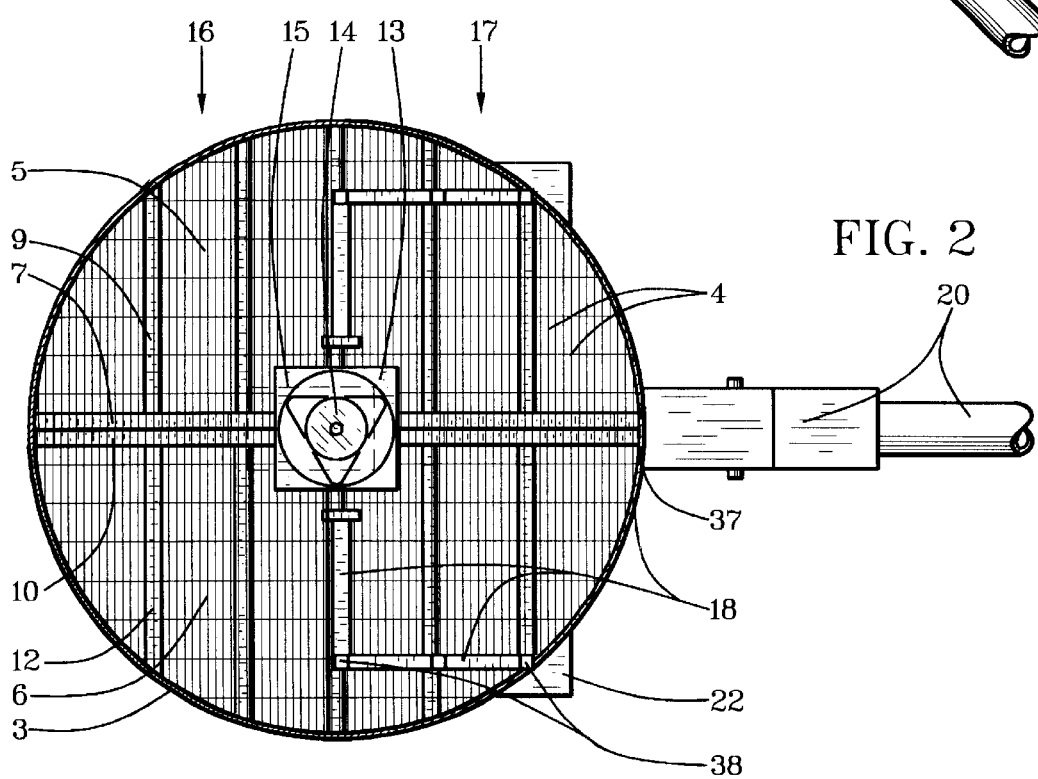
FIG. 2 is a top view of the sectional camera platform on the end of the aerial boom.
Figure 5:
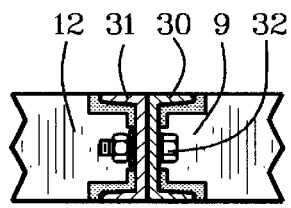
FIG. 5 is a cutaway end view of attachment rods that are channel rods having joining edges that are juxtaposed, welded to support rods and bolted together.

Referring to FIGS. 1–5, the first attachment rod 7 and the second attachment rod 10 shown in FIGS. 2 and 4 can be a first channel rod 30 and a second channel rod 31 welded to the first support rod 9 and the second support rod 12 respectively and bolted together with assembly fastener 32 at channel bottoms as shown in FIG. 5.

As shown in FIG. 2, the guard railing 18 can be divided into sections at a railing joint 37 and at railing uprights 38 for ease of storage. The railing joint 37 is in line with a linear joint of the first attachment rod 7 and the second attachment rod 10. It is in line with and vertically above end joints of the first perimeter rod 8 and the second perimeter rod 11 as depicted oppositely across the platform floor 2. Division of the guard railing into two or more sections also allows its bottom portions to be fastened rigidly and conveniently to the first support rods 9 and the second support rods 12.

A new and useful sectional camera platform having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A sectional camera platform comprising:
   a platform floor surrounded by a kick plate extended upwardly to about ankle height above a top side of outside edges of the platform floor;
   the platform floor having floor sections that are sized, shaped and structured predeterminedly for being joined for on-site cinematography and disjoined for storage and transport;
   platform attachments on the platform floor for attachment of predetermined equipment fasteners with which platform-maneuvering equipment is fastened to the camera platform;
   a camera-post attachment predeterminedly proximate a center of the platform floor;
   guard railing positioned at predetermined outside edges of a cage for workers on the platform floor;
   the guard railing having railing sections extended upwardly to about waist height above the top side of the outside edges of the floor; and the cage being oppositely disposed from a view extension of the platform floor.

2. The sectional camera platform of claim 1 wherein:

the platform is generally round with the cage generally aft of the view extension.

3. The sectional camera platform of claim 1 wherein:

the platform floor is grating with predetermined spacing for vertical visibility between orthogonally disposed grate members.

4. The sectional camera platform of claim 1 wherein:

the floor sections include joining edges having attachment rods adjacent to attachment rods of joining edges of adjacent floor sections.

5. The sectional camera platform of claim 4 wherein:

the floor sections have support rods intermediate the attachment rods, said attachment rods being connected to the kick plate.

6. The sectional camera platform of claim 4 wherein:

the attachment rods of the joining edges of the adjacent floor sections are joinable with predetermined fasteners for which the attachment rods have mating fastener construction.

7. The sectional camera platform of claim 6 wherein:

the platform attachments are proximate joined portions of the attachment rods that are adjacent.

8. The sectional camera platform of claim 7 wherein:

the platform attachments include fastener housings with fastener-shaft receptacles on predetermined attachment portions of the sectional camera platform.

9. A sectional camera platform comprising:

a generally round platform floor surrounded by a kick plate extended upwardly a predetermined distance above a top side of outside edges of the platform floor;

the platform floor having floor sections that are sized, shaped and structured predeterminedly for being joined for assembly and disjoined for disassembly;

platform attachments on the platform floor for attachment of predetermined platform-maneuvering equipment to the camera platform;

a camera-post attachment predeterminedly proximate a center of the platform floor;

guard railing positioned at predetermined outside edges of a cage for workers on the platform floor;

the guard railing having railing sections extended upwardly to about waist height above the top side of the outside edges of the floor;

the cage being oppositely disposed from a view extension of the platform floor;

the floor sections include joining edges having attachment rods adjacent to attachment rods of joining edges of adjacent floor sections; and the attachment rods of the joining edges of the adjacent floor sections are joinable with predetermined fasteners for which the attachment rods have mating fastener construction.

10. The sectional camera platform of claim 9 wherein:

the platform floor is a grate with predetermined spacing between orthogonally disposed grate members.

11. The sectional camera platform of claim 9 wherein:

the platform attachments include fastener housings with fastener-shaft receptacles on predetermined attachment portions of the sectional camera platform.

12. A sectional camera platform comprising:

a cage for workers juxtaposed to a view extension for photographic view from a camera;

a platform floor of the cage;

a platform floor of the view extension;

cage railing surrounding the cage;

platform sections with which the sectional camera platform is constructed to be assembled for cinematographic use and disassembled for storage and transport;

platform attachments on the sectional camera platform for attachment of predetermined platform-maneuvering equipment to the sectional camera platform; and a camera-post attachment predeterminedly intermediate the cage and view extension.

13. The sectional camera platform of claim 12 wherein:

the platform is generally round with the cage and the view extension having platform-floor areas that are oppositely disposed.

14. The sectional camera platform of claim 12 wherein:

the platform floor is a grate with predetermined spacing between orthogonally disposed grate members.

15. The sectional camera platform of claim 12 wherein:

the platform sections include joining edges having attachment rods adjacent to attachment rods of joining edges of adjacent platform sections.

16. The sectional camera platform of claim 15 wherein:

the floor sections have support rods intermediate the attachment rods, said attachment rods being connected to the kick plate.

17. The sectional camera platform of claim 15 wherein:

the attachment rods of the joining edges of the adjacent platform sections are joinable with predetermined fasteners for which the attachment rods have mating fastener construction.

18. The sectional camera platform of claim 15 wherein:

the attachments are proximate joined portions of the attachment rods that are adjacent.

19. The sectional camera platform of claim 17 wherein:

the platform attachments include fastener housings with fastener-shaft orifices on predetermined attachment portions of the sectional camera platform.

20. The sectional camera platform of claim 1 and further comprising:

a pivot axle intermediate a pivot base on a platform attachment and a pivot attachment on the platform floor;

the platform attachment being in rotational reaction to a pivot gear on a pivot motor that is attached to the pivot base for selective-direction rotation of gear teeth on the pivot attachment; and the pivot gear being matched to the gear teeth.

21. The sectional camera platform of claim 12 and further comprising:

a pivot axle intermediate a pivot base on a platform attachment and a pivot attachment on the platform floor;

the platform attachment being in rotational reaction to a pivot gear on a pivot motor that is attached to the pivot base for selective-direction rotation of gear teeth on the pivot attachment; and the pivot gear being matched to the gear teeth.

* * * * *